May 16, 1933.    A. SCHNEIDER    1,908,714

FLOATING ISLE, FLOATING BRIDGE, FLOATING DOCK, AND SIMILAR CONSTRUCTION

Filed July 15, 1930    2 Sheets-Sheet 1

INVENTOR
Anton Schneider
BY
ATTORNEY

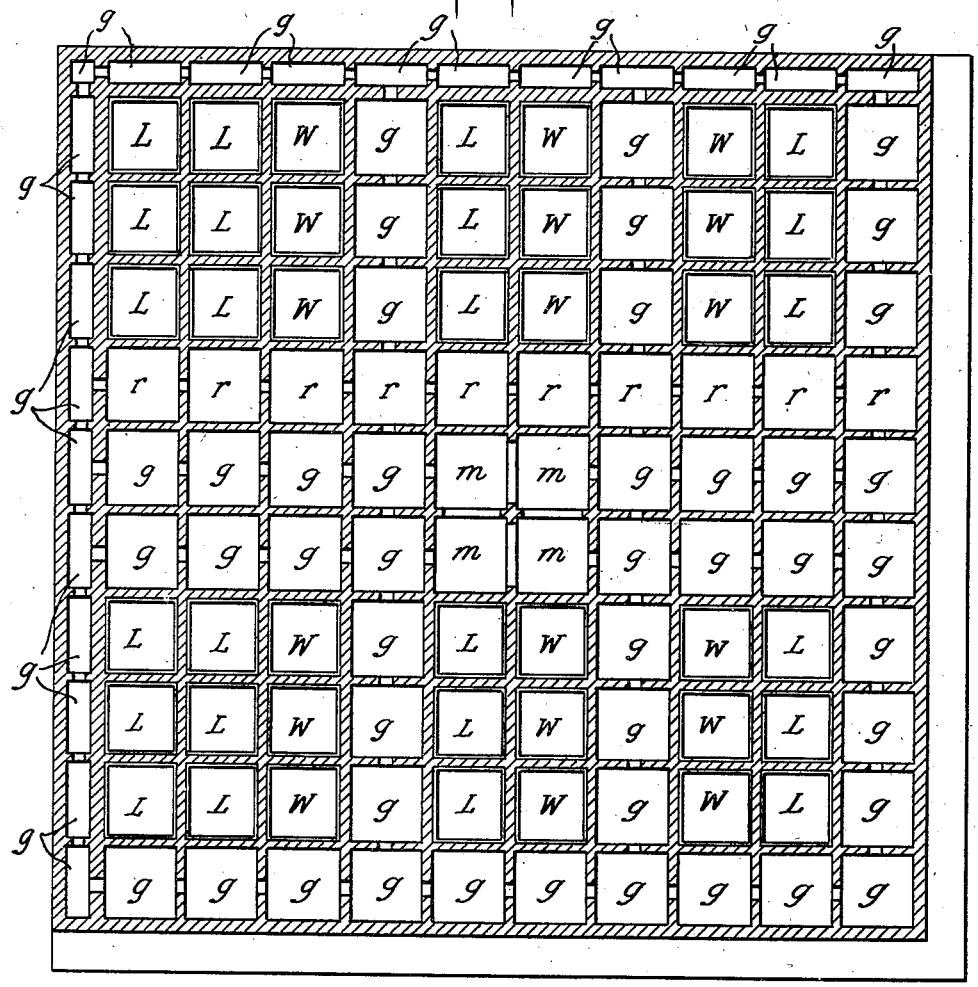

Patented May 16, 1933

1,908,714

UNITED STATES PATENT OFFICE

ANTON SCHNEIDER, OF KARLSRUHE IN BADEN, GERMANY

FLOATING ISLE, FLOATING BRIDGE, FLOATING DOCK, AND SIMILAR CONSTRUCTION

Application filed July 15, 1930. Serial No. 468,218.

The floating of ferries (floating isles) has been based hitherto on the physical law of technics, of the material being lighter than water, its specific weight lying under 1. Ferries are a substitute or makeshift for bridges or ships.

As further small floating isles we have the floating docks, constructed on the same principle as the ferries out of wood and metal etc., which however likewise do not last but a very moderate time, besides being very high in cost. This carrying construction is based on the physical law of technics of water displacement, the same as ships of all kind. In spite of their great bulk they are subjected to severe rocking in heavy seas, just the same as is the case with all ships on rivers and at sea, the construction of which, for the purpose of carrying cargo and passengers, is also based entirely on the physical law of water displacement.

All docks and floating bridges, just for the reason of their type of construction, must find a secure place of anchorage in the depth of the water, in order to weaken thereby the rocking caused by stormy waves and further in order to prevent their being washed away from their appointed station.

At many harbours and landing places it is impossible however to find a safe place of anchorage in the depth of the water, owing to enormous depth of same, wherefore the technical profession considers the providing of safe anchorage at such places as technically impossible. Also at certain shipping places, which are exposed more or less continuously to heavy seas, steamers are forced to discharge and reload cargo and passengers under the most difficult and expensive circumstances.

The construction of floating isles on the ocean, which problem has occupied technical science during the last few years very much, in spite of a large number of attempts having been made in order to solve this problem, has also been considered as technically impossible, just for the reason that there is no known method of anchorage.

All above mentioned and in technical science known types of construction are based on the principle of water displacement, whereby in consequence at harbours of great sea depth anchorage is impossible—and in heavy stormy seas all such types of construction are rocked and thrown about by the waves, and run danger of being washed away or foundered.

The aforementioned disadvantages are all eliminated by my invention, whose fundamental idea is based on the physical law of technic of water compression by inspanning (enclosing), the construction of my invention having its fundamental principle just in opposite direction to the principle of water displacement.

Hitherto ships have been constructed by having down under a convex keel, which broadens out steadily higher up towards the surface of the water. This floating body displaces the water in an upward direction, more or less according to its weight. The law of cohesion, in case of a stormy sea by which the water is disturbed, at once has its effect and the ship's body is thrown about on the waves.

A quite different result is obtained by my method of construction, see drawings No. 1 and No. 2. A horizontal surface area of dimension as required, is provided underneath in the water with rib carriers, adjusted in squares or rectangles, going deep down into the water. By the weight of the construction and the weight of the superload and sundry accessory constructions on the surface area, the water having been inspanned (enclosed) between the rib carriers, forming water cells, is more and more compressed, and consequently is made capable of bearing the load. Especially several yards in the depth of the sea, the water is pressed down (compressed) by its own (top) overweight and therefore possesses quite enormous carrying power.

By the dimensional area on the surface, in conjunction with the great number of cells underneath, which reach far down into the water, while compressing by inspanning the water, further by the natural law of adhesion, which contributes in favour of my construction, the effect is produced, that my construction cannot tilt or turn over. As is known the highest billows in a storm have a limited depth down below, as soon however as the rib carriers of the new construction pass beyond that limit, the constructed isle of my invention is secured quite safely.

The new construction, contrary to all hitherto known constructions can exist, without anchorage down below, in deep water on a stormy sea, but besides that my construction is considerably cheaper than all other constructions hitherto known, further it is eminently more durable and stable.

As a special characteristic of the new application is to be noted, that the rib carriers $a$ and $b$ in Figs. 1 and 2, which reach far down into the water, possess down below a wedge formed cutting edge. These carrying ribs must not have any abutment in the depth of the water, where the pressure is very great, as same would influence the complex disadvantageously in case of artificially having to raise or sink same.

By means of the wedge arrangement with the cutting edge the water, which by its own proper weight is already strongly compressed, is locked into the cells $e$ Fig. 2, and thereby increases the loading capacity of the construction on the surface.

The force of adhesion, which forms itself in an immense measure at the edge of the rib carriers $a$ and $b$ in Figs. 1 and 2, prevents a sidely tilt or unsteadiness of the construction even in a stormy heavy sea, and secures to the entire complex of the new construction a lasting stationary position.

The cells $e$ Fig. 1, are constructed of stable rib-carriers out of reinforced concrete, which are statically calculated and correspondingly strengthened, in order to be able to resist sidely hydrostatic pressure as well as top pressure, caused by the effective and real weight on the surface.

The drawings herewith give a practical form of the construction of my invention, as is shown in 3 figures: Fig. 1 shows a dimensional area, with the cells underneath, constructed by means of the rib carriers, representing the carrying construction parts.

Fig. 3 shows a dimensional area as in Fig. 1, a horizontal view, with the light metallic compressed air—and water chambers as above described, as well as the required passages to the power station (motors for air and water) of the complex.

Figure 1:
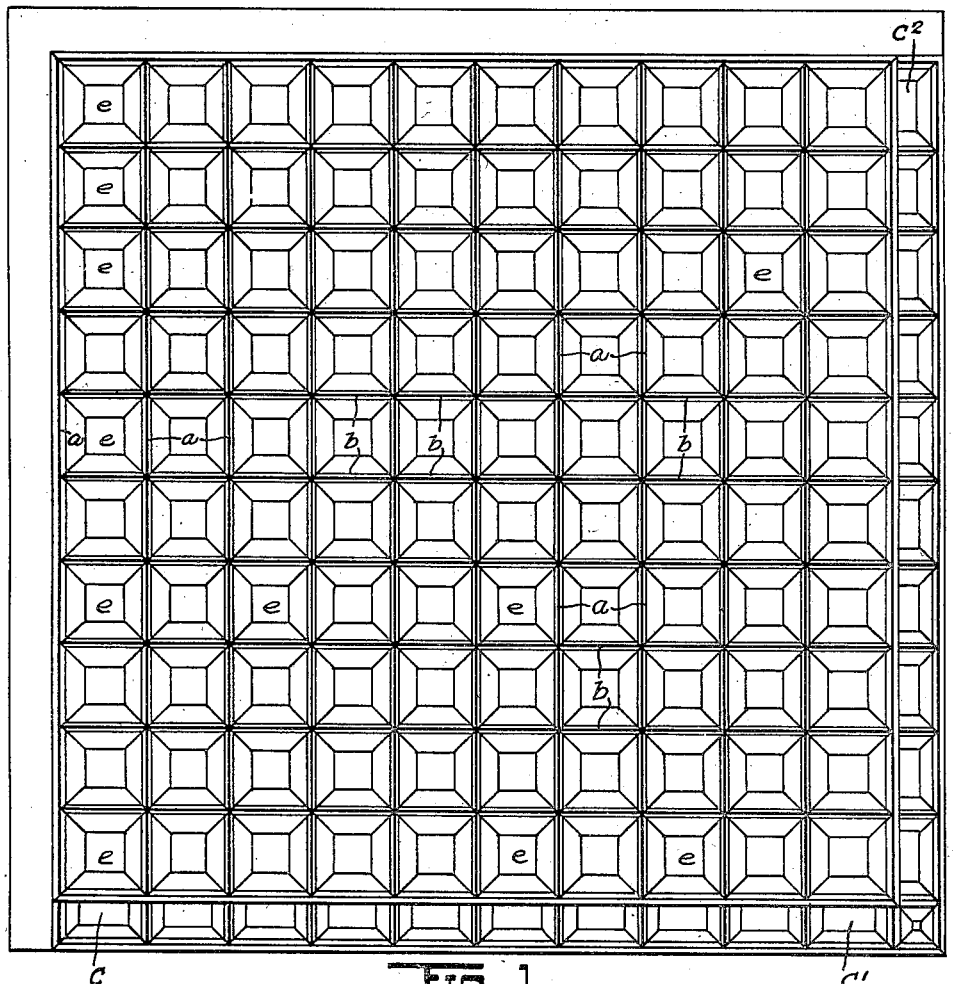

The dimensional area in Fig. 1, is shown in its underview, which is composed of cells $e$. The cells may be constructed by means of the rib carriers in squares, rectangles or in curved lines. The dimensional area as shown in Fig. 1, in its design and constructional parts is applicable alike for floating isles, floating bridges and docks.

Within the free space of each cell $e$ the water is inspanned (enclosed) and compressed, resulting in first place from the own weight of the construction, in second place from the weight of sundry constructions on the top surface.

Figure 2:
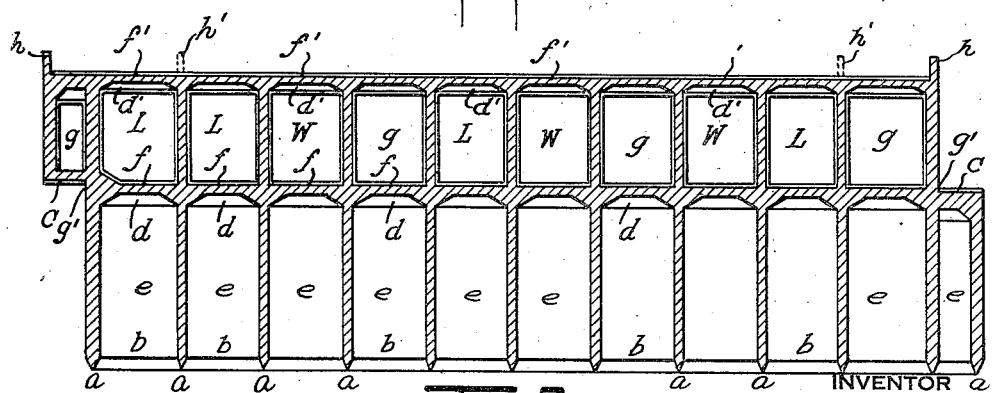
Fig. 2 shows a cross cut, explaining how the cells are placed in vertical direction, with the overlying compressed air—and waterchambers, in order to be able to raise and sink artificially the whole complex of the construction, as this may become necessary owing to high or low tide.

The highest point of pressure takes place between the water and the horizontal points $a$ and $b$ in Figs. 1 and 2, at the end of the cutting edge of the rib carriers. At this point the immense force of adhesion of the inspanned water in cell $e$ has its greatest effect, which is all the greater the deeper the rib carriers extend into the water.

The level area $c-c\,1,-c\,2$, in Fig. 1, forms the layer on and layer against abutment, at which points the adjoining dimensional area is connected by means of metal anchorage. The same as at the abutments every end point of the rib carriers $a$ and $b$ may serve for the same purpose.

In Fig. 2, $d$ and $d\,1$, show the archings required for the purpose of strengthening the carrying construction $f$ and $f\,1$, $h$ and $h\,1$, in Fig. 2, show how the brink of an isle or of a floating bridge may be protected by a parapet.

Fig. 3 shows a horizontal cut through the specially constructed chambers, lying over the water cells, which according to their destined purpose L=airchambers for raising, and W=waterchambers for sinking. Their use is in connection with the motors L=air and W=water, which may be placed in a central point of the construction. In Fig. 3, $r$=reserve chambers, and $m$=middle field for motors (power station). The placing of the air—and waterchambers as shown in Fig. 3 may be varied and they may be arranged differently if same is considered necessary and advantageous. The designation $g$ shows the passages.

Against sea currents in the depth of the sea, turbines should be built in, in order to regulate the appointed stationary place against the aforementioned sea currents.

A number of dimensional areas can be assembled and jointed together by means of metallic anchorage as above described. Thus a floating bridge of any width and length can be constructed. A floating isle can in this way be enlarged in all directions. By enlarging the size of the isle the erection of a light tower will become possible, further tanks for petrol etc. can be put up for supplying flying machines of all kinds. Besides the landing and ascending of airships and aeroplanes will thereby be made possible on the isle. Floating docks of any size can be constructed by joining together a number of dimensional areas, without thereby meeting any difficulties in a constructional or any other way in pursuance of all these extensions.

I declare that what I claim is:—

A concrete station adapted to float in water, and including a horizontally extending plate member, ribs depending therefrom and forming therewith a plurality of juxtaposed chambers opened at the lower ends thereof, and having rectangular cross-sections, said ribs having the lower edges thereof wedge-shaped, a second horizontally extending plate member spaced above said first plate member and forming the upper deck of said station, a plurality of chambers of rectangular cross-section confined between said plate members, means on the upper plate member for mounting a pumping mechanism for pumping air or water from or into said last mentioned chambers to selectively raise or lower said station, and means disposed along one or more sides of said station for connecting it to a similar adjoining station.

In testimony whereof, I affix my signature.

ANTON SCHNEIDER.